US012631147B2

(12) United States Patent
Silvester et al.

(10) Patent No.: US 12,631,147 B2
(45) Date of Patent: *May 19, 2026

(54) AIRCRAFT ENGINE

(71) Applicant: ROLLS-ROYCE PLC, London (GB)

(72) Inventors: Matthew Silvester, Derby (GB);
Geoffrey Hughes, Bristol (GB)

(73) Assignee: ROLLS-ROYCE PLC, London (GB)

( * ) Notice: Subject to any disclaimer, the term of this
patent is extended or adjusted under 35
U.S.C. 154(b) by 0 days.

This patent is subject to a terminal dis-
claimer.

(21) Appl. No.: 19/320,435

(22) Filed: Sep. 5, 2025

(65) Prior Publication Data

US 2026/0002476 A1      Jan. 1, 2026

Related U.S. Application Data

(60) Continuation of application No. 19/036,330, filed on
Jan. 24, 2025, now Pat. No. 12,435,673, which is a
division of application No. 17/738,198, filed on May
6, 2022, now abandoned, which is a continuation of
application No. 17/331,020, filed on May 26, 2021,
now Pat. No. 11,359,549.

(30) Foreign Application Priority Data

Jun. 3, 2020    (GB) ...................................... 2008334

(51) Int. Cl.
| | |
|---|---|
| *F02C 7/36* | (2006.01) |
| *B64D 27/10* | (2006.01) |
| *F02C 3/073* | (2006.01) |
| *F02K 3/06* | (2006.01) |
| *F04D 25/02* | (2006.01) |
| *F04D 29/40* | (2006.01) |

(52) U.S. Cl.
CPC ................ *F02C 7/36* (2013.01); *B64D 27/10*
(2013.01); *F02C 3/073* (2013.01); *F02K 3/06*
(2013.01); *F04D 25/02* (2013.01); *F04D*
*29/40* (2013.01); *F05D 2220/323* (2013.01);
*F05D 2220/36* (2013.01); *F05D 2260/4031*
(2013.01); *F05D 2260/96* (2013.01)

(58) Field of Classification Search
CPC . F02C 7/36; F02C 3/073; B64D 27/10; F02K
3/06; F05D 2220/36; F05D 2220/323
See application file for complete search history.

*Primary Examiner* — David P. Olynick
(74) *Attorney, Agent, or Firm* — Oliff PLC

(57) ABSTRACT

A gas turbine engine for an aircraft includes a fan system
having a reverse travelling wave first flap mode, Fan RTW,
and including a fan located upstream of the engine core; a
fan shaft; and a front engine structure arranged to support the
fan shaft and having a front engine structure nodding mode
comprising a pair of modes at similar, but not equal, natural
frequencies in orthogonal directions; and a gearbox. An LP
rotor system including the fan system and a gearbox output
shaft arranged to drive the fan shaft has a first reverse whirl
rotor dynamic mode, Rotor RW, and a first forward whirl
rotor dynamic mode, 1FW. The engine has a maximum
take-off speed, MTO. A backward whirl frequency margin
of:

$$\frac{\text{the lowest frequency of either mode Fan } RTW \text{ or Rotor } RW \text{ at the } MTO \text{ speed}}{\text{the } MTO \text{ speed}}$$

may be in the range from 15 to 50%.

20 Claims, 10 Drawing Sheets

AIRCRAFT ENGINE

CROSS-REFERENCE TO RELATED APPLICATIONS

This is a Continuation of application Ser. No. 19/036,330 filed Jan. 24, 2025, which is a Divisional of application Ser. No. 17/738,198 filed May 6, 2022, which is a Continuation of application Ser. No. 17/331,020 filed May 26, 2021, which in turn claims the benefit of priority from UK Patent Application Number 2008334.1 filed on Jun. 3, 2020, the entire contents of each of which are incorporated herein by reference.

BACKGROUND

1. Field of the Disclosure

The present disclosure relates to aircraft engines with improved dynamic characteristics, and more specifically to engines with improved handling of vibrational modes by the avoidance of frequency coincidence between natural frequencies and their potential excitation sources, and methods of using such engines.

SUMMARY

According to a first aspect there is provided a gas turbine engine for an aircraft comprising an engine core comprising a turbine, a compressor, and a core shaft connecting the turbine to the compressor; and a fan system having a reverse travelling wave first flap mode, Fan RTW. The fan system comprises a fan located upstream of the engine core, the fan comprising a plurality of fan blades; and a fan shaft. The engine further comprises a gearbox, and a gearbox output shaft arranged to couple an output of the gearbox to the fan shaft. The gearbox receives an input from the core shaft and outputs drive to the fan via the gearbox output shaft so as to drive the fan at a lower rotational speed than the core shaft. The fan system and the gearbox output shaft together form a low pressure (LP) rotor system having a first reverse whirl rotor dynamic mode, Rotor RW. The engine has a maximum take-off speed, MTO. A backward whirl frequency margin of:

$$\frac{\text{the lowest frequency of either mode Fan } RTW \text{ or Rotor } RW \text{ at the } MTO \text{ speed}}{\text{the } MTO \text{ speed}}$$

is in the range from 15 to 50%.

The backward whirl frequency margin may be greater than 25%.

The backward whirl frequency margin may be greater than 20%, 25%, 30%, or 35%, and/or optionally less than 50%, 45%, or 40%. The backward whirl frequency margin may be in an inclusive range bounded by any two of the values in the previous sentence (i.e. the values may form upper or lower bounds).

If the rotor first reverse whirl mode (Rotor RW) and/or reverse travelling wave first fan blade flap mode (Fan RTW) have an insufficient frequency margin above the maximum fan shaft rotation speed (MTO, defined herein in terms of a rotation frequency of the shaft), either or both of these modes can be excited by a forcing load that is static in the inertial reference frame (as viewed by an outside observer viewing the engine). Maintaining the backward whirl frequency margin within a claimed range may therefore allow this response amplification to be reduced or avoided.

The lowest frequency of either mode Fan RTW or Rotor RW at the MTO speed may be in the range from 4 Hz to 22 Hz, optionally in the range from 5 Hz to 15 Hz.

The MTO speed may be in the range from 25 Hz to 45 Hz.

The MTO speed may be in the range from 25 Hz to 30 Hz and the fan may have a fan diameter greater than 216 cm (85 inches).

The MTO speed may be in the range from 35 Hz to 45 Hz and the fan may have a fan diameter less than 216 cm (85 inches).

The LP rotor system may have a first forward whirl rotor dynamic mode, 1FW, and a forward whirl frequency margin of:

$$\frac{\begin{array}{c}\text{the frequency difference between the intersection of} \\ 1FW \text{ and the first engine order line} \\ \text{and the first engine order line at the } MTO \text{ speed}\end{array}}{\text{the } MTO \text{ speed}}$$

may be in the range from 10 to 100%.

The forward whirl frequency margin may be greater than 20%, 30%, 40%, or 50%, and/or optionally less than 100%, 90%, 80%, 70%, or 60%. The forward whirl frequency margin may be in an inclusive range bounded by any two of the values in the previous sentence (i.e. the values may form upper or lower bounds).

The frequency of the 1FW mode where it intersects the first engine order line (1EO) may be calculated or read off a Campbell Diagram. Similarly, the frequency of 1EO at the MTO speed may be calculated or read off a Campbell Diagram, where 1EO intersects the MTO line.

The intersection of 1FW with the synchronous (first engine order) line, 1EO, on a Campbell Diagram is commonly referred to as "synchronous 1FW". The equation above may therefore be re-written as:

$$\frac{\begin{array}{c}\text{the frequency difference between synchronous } 1FW \text{ and} \\ \text{the first engine order line at } MTO \text{ speed}\end{array}}{\text{the } MTO \text{ speed}}$$

A mutual frequency margin of:

$$\frac{\begin{array}{c}\text{the frequency difference between mode Fan } RTW \\ \text{and mode Rotor } RW \text{ at the } MTO \text{ speed}\end{array}}{\left(\begin{array}{c}\text{the lowest frequency of either mode Fan } RTW \text{ or} \\ \text{Rotor } RW \text{ at the } MTO \text{ speed} + \text{the } MTO \text{ speed}\end{array}\right)}$$

may be in the range from 5 to 50%.

The mutual frequency margin may be greater than 10%.

The mutual frequency margin may be greater than 10%, 15%, 20%, or 25%, and/or optionally less than 50%, 45%, 40%, or 35%. The mutual frequency margin may be in an inclusive range bounded by any two of the values in the previous sentence (i.e. the values may form upper or lower bounds).

The frequency difference between mode Fan RTW and mode Rotor RW at the MTO speed may be in the range from 2 Hz to 15 Hz, optionally from 5 Hz to 15 Hz.

The engine may comprise a front engine structure arranged to support the fan shaft. The front engine structure may have a front engine structure nodding mode, mode FSN, which may comprise a pair of modes at similar, but not equal, natural frequencies in orthogonal directions. A front engine structure frequency margin defined as:

$$\frac{\text{the frequency difference between mode } FSN \text{ and the highest frequency of either synchronous Fan } RTW \text{ or synchronous Rotor } RW}{\text{the lowest natural frequency of the front structure nodding pair of modes}}$$

may be in the range from 5 to 50%.

The front engine structure frequency margin may be greater than 10%.

The front engine structure frequency margin may be greater than 10%, 15%, 20%, or 25%, and/or optionally less than 50%, 45%, 40%, or 35%. The front engine structure frequency margin may be in an inclusive range bounded by any two of the values in the previous sentence (i.e. the values may form upper or lower bounds).

The frequency difference between mode FSN and the highest frequency of either synchronous Fan RTW or synchronous Rotor RW may be in the range from 2 Hz to 15 Hz, optionally from 2 Hz to 10 Hz.

The lowest natural frequency of the front structure nodding pair of modes may be in the range from 14 Hz to 26 Hz, optionally from 15 Hz to 25 Hz.

As mentioned above with respect to 1FW. "synchronous" Fan RTW or Rotor RW refers to the intersection of the respective mode (Fan RTW or Rotor RW) with the first engine order line—i.e. the frequency value at which the lines intersect is used. Of Fan RTW and Rotor RW, whichever mode has the highest synchronous frequency is selected for use in the ratio shown above.

It will be appreciated that mode FSN generally has a constant frequency in many embodiments. Where there is any variation, the synchronous frequency value is used (i.e. the frequency value at which the mode FSN line intersects the first engine order line).

According to a second aspect, there is provided a method of operation of a gas turbine engine for an aircraft comprising: an engine core comprising a turbine, a compressor, and a core shaft connecting the turbine to the compressor; a fan system having a reverse travelling wave first flap mode, Fan RTW, and comprising a fan located upstream of the engine core, the fan comprising a plurality of fan blades and a fan shaft; and a gearbox and a gearbox output shaft arranged to couple an output of the gearbox to the fan shaft, wherein the gearbox receives an input from the core shaft and outputs drive to the fan via the gearbox output shaft so as to drive the fan at a lower rotational speed than the core shaft; and wherein the fan system and the gearbox output shaft together form an LP rotor system having a first reverse whirl rotor dynamic mode, Rotor RW.

The method comprises operating the engine such that a backward whirl frequency margin of:

$$\frac{\text{the lowest frequency of either mode Fan } RTW \text{ or Rotor } RW \text{ at the maximum take-off, } MTO, \text{ speed}}{\text{the } MTO \text{ speed}}$$

is in the range from 15 to 50%.

The backward whirl frequency margin may be greater than 20%, 25%, 30%, or 35%, and/or optionally less than 50%, 45%, or 40%. The backward whirl frequency margin may be in an inclusive range bounded by any two of the values in the previous sentence (i.e. the values may form upper or lower bounds).

The method may comprise operating the engine at speeds up to a maximum take-off, MTO, speed of the engine. The method may comprise operating the engine at the MTO speed.

The method may comprise operating the engine such that the lowest frequency of either mode Fan RTW or Rotor RW at the MTO speed is in the range from 4 Hz to 22 Hz, optionally from 5 Hz to 15 Hz.

The fan system and the gearbox output shaft together may form an LP rotor system having a first reverse whirl rotor dynamic mode, Rotor RW and the method may comprise operating the engine such that a forward whirl frequency margin of:

$$\frac{\text{the frequency difference between synchronous } 1FW \text{ and the first engine order line at } MTO \text{ speed}}{\text{the } MTO \text{ speed}}$$

is in the range from 10 to 100%.

The forward whirl frequency margin may be greater than 20%, 30%, 40%, or 50%, and/or optionally less than 100%, 90%, 80%, 70%, or 60%. The forward whirl frequency margin may be in an inclusive range bounded by any two of the values in the previous sentence (i.e. the values may form upper or lower bounds).

The method may comprise operating the engine such that the frequency difference between synchronous 1FW and the first engine order line at MTO speed is in the range from 8 Hz to 45 Hz, optionally from 20 Hz to 40 Hz.

According to an aspect, there is provided a gas turbine engine for an aircraft comprising: an engine core comprising a turbine, a compressor, and a core shaft connecting the turbine to the compressor; and a fan system comprising: a fan located upstream of the engine core, the fan comprising a plurality of fan blades and a fan shaft. The engine further comprises a gearbox, and a gearbox output shaft arranged to couple an output of the gearbox to the fan shaft. The gearbox receives an input from the core shaft and outputs drive to the fan via the gearbox output shaft so as to drive the fan at a lower rotational speed than the core shaft. The fan system and the gearbox output shaft together form an LP rotor system having a first forward whirl rotor dynamic mode, 1FW. The engine has a maximum take-off speed, MTO. A forward whirl frequency margin of:

$$\frac{\text{the frequency difference between synchronous } 1FW \text{ and the first engine order line at } MTO \text{ speed}}{\text{the } MTO \text{ speed}}$$

is in the range from 10 to 100%.

The forward whirl frequency margin may be greater than 30%.

The forward whirl frequency margin may be greater than 20%, 30%, 40%, or 50%, and/or optionally less than 90%, 80%, 70%, or 60%. The forward whirl frequency margin may be in an inclusive range bounded by any two of the values in the previous sentence (i.e. the values may form upper or lower bounds).

If the rotor first forward whirl mode (1FW) has an insufficient frequency margin above the maximum fan speed (MTO speed), this mode can be excited by unbalance on the rotor. The forward whirl frequency margin may therefore be tuned appropriately, selecting a value falling within a claimed range, to reduce or avoid excitation of this mode.

The fan system may have a reverse travelling wave first flap mode, Fan RTW. The LP rotor system may have a first reverse whirl rotor dynamic mode, Rotor RW.

A backward whirl frequency margin of:

$$\frac{\text{the lowest frequency of either mode Fan}}{\text{the } MTO \text{ speed}}$$

may be in the range from 15 to 50%.

A mutual frequency margin of:

$$\frac{\text{the frequency difference between mode Fan } RTW \text{ and}}{\left(\begin{array}{c}\text{the lowest frequency of either mode Fan } RTW \text{ or Rotor} \\ RW \text{ at the } MTO \text{ speed} + \text{the } MTO \text{ speed}\end{array}\right)}$$

may be in the range from 5 to 50%.

The engine may comprise a front engine structure arranged to support the fan shaft. The front engine structure may have a front engine structure nodding mode, which may comprise a pair of modes at similar, but not equal, natural frequencies in orthogonal directions. A front engine structure frequency margin of:

$$\frac{\begin{array}{c}\text{the frequency difference between mode } FSN \text{ and} \\ \text{the highest frequency of either synchronous} \\ \text{Fan } RTW \text{ or synchronous Rotor } RW\end{array}}{\begin{array}{c}\text{the lowest natural frequency of the front} \\ \text{structure nodding pair of modes}\end{array}}$$

may be in the range from 5 to 50%.

According to an aspect, there is provided a gas turbine engine for an aircraft comprising: an engine core comprising a turbine, a compressor, and a core shaft connecting the turbine to the compressor; and a fan system having a reverse travelling wave first flap mode, Fan RTW. The fan system comprises a fan located upstream of the engine core, the fan comprising a plurality of fan blades; and a fan shaft. The engine further comprises a gearbox, and a gearbox output shaft arranged to couple an output of the gearbox to the fan shaft. The gearbox receives an input from the core shaft and outputs drive to the fan via the gearbox output shaft so as to drive the fan at a lower rotational speed than the core shaft. The fan system and the gearbox output shaft together form an LP rotor system having a first reverse whirl rotor dynamic mode, Rotor RW. The engine has a maximum take-off speed, MTO. A mutual frequency margin of:

$$\frac{\text{the frequency difference between mode}}{\left(\begin{array}{c}\text{the lowest frequency of either mode Fan } RTW \text{ or} \\ \text{Rotor } RW \text{ at the } MTO \text{ speed} + \text{the } MTO \text{ speed}\end{array}\right)}$$

is in the range from 5 to 50%.

The mutual frequency margin may be greater than 10%.

The mutual frequency margin may be greater than 10%, 15%, 20%, or 25%, and/or optionally less than 45%, 40%, or 35%. The mutual frequency margin may be in an inclusive range bounded by any two of the values in the previous sentence (i.e. the values may form upper or lower bounds).

If the rotor first reverse whirl mode (Rotor RW) and reverse travelling wave first fan blade flap mode (Fan RTW) have an insufficient mutual frequency margin (i.e. if they are too close to each other in frequency), these modes can interact such that any forcing as described above may excite both of these modes instead of just one. This may again lead to deleterious increased amplitudes of vibrational responses. The mutual frequency margin may therefore be tuned appropriately, selecting a value falling within a claimed range, to reduce or avoid this interaction.

A backward whirl frequency margin of:

$$\frac{\begin{array}{c}\text{the lowest frequency of either mode} \\ \text{Fan } RTW \text{ or Rotor } RW \text{ at the } MTO \text{ speed}\end{array}}{\text{the } MTO \text{ speed}}$$

may be in the range from 15 to 50%.

The LP rotor system may have a first forward whirl rotor dynamic mode, 1FW. A forward whirl frequency margin of:

$$\frac{\begin{array}{c}\text{the frequency difference between sychronous} \\ 1FW \text{ and the first engine order line at } MTO \text{ speed}\end{array}}{\text{the } MTO \text{ speed}}$$

may be in the range from 10 to 100%.

The engine may comprise a front engine structure arranged to support the fan shaft. The front engine structure may have a front engine structure nodding mode, which may comprise a pair of modes. The modes of the pair may be at similar, but not equal, natural frequencies in orthogonal directions. A front engine structure frequency margin of:

$$\frac{\begin{array}{c}\text{the frequency difference between} \\ \text{mode } FSN \text{ and the highest frequency of either} \\ \text{synchronous Fan } RTW \text{ or synchronous Rotor } RW\end{array}}{\begin{array}{c}\text{the lowest natural frequency of} \\ \text{the front structure nodding pair of modes}\end{array}}$$

may be in the range from 5 to 50%.

According to an aspect, there is provided a gas turbine engine for an aircraft comprising: an engine core comprising a turbine, a compressor, and a core shaft connecting the turbine to the compressor; and a fan system having a reverse travelling wave first flap mode, Fan RTW. The fan system comprises: a fan located upstream of the engine core, the fan comprising a plurality of fan blades; and a fan shaft. The engine further comprises a front engine structure arranged to support the fan shaft, the front engine structure having a front engine structure nodding mode comprising a pair of modes at similar, but not equal, natural frequencies in orthogonal directions. The engine further comprises a gearbox, and a gearbox output shaft arranged to couple an output of the gearbox to the fan shaft. The gearbox receives an input from the core shaft and outputs drive to the fan via the gearbox output shaft so as to drive the fan at a lower rotational speed than the core shaft. The fan system and the gearbox output shaft together form an LP rotor system having a first reverse whirl rotor dynamic mode, Rotor RW. The engine has a maximum take-off speed, MTO. A front engine structure frequency margin of:

$$\frac{\begin{array}{c}\text{the frequency difference between}\\ \text{mode } FSN \text{ and the highest frequency of either}\\ \text{synchronous Fan } RTW \text{ or synchronous Rotor } RW\end{array}}{\begin{array}{c}\text{the lowest natural frequency of}\\ \text{the front structure nodding pair of modes}\end{array}}$$

is in the range from 5 to 50%.

The front engine structure frequency margin may be greater than 10%.

The front engine structure frequency margin may be greater than 10%, 15%, 20%, or 25%, and/or optionally less than 45%, 40%, or 35%. The front engine structure frequency margin may be in an inclusive range bounded by any two of the values in the previous sentence (i.e. the values may form upper or lower bounds).

This combination of orthogonal modes may cause the front engine structure vibration response to rotor unbalance to be elliptical in orbit. The elliptical orbit may comprise both forward and reverse travelling wave components; a mechanism is therefore presented to excite reverse whirl modes Fan RTW or Rotor RW if they are coincident or near-coincident with the front engine structure nodding (FSN) frequency. This combined effect could rapidly increase the vibration response amplitude to nuisance levels, or in extreme cases to potentially damaging/hazardous levels. The front engine structure frequency margin may therefore be tuned appropriately, selecting a value falling within a claimed range, to reduce or avoid this amplification mechanism.

The engine may be arranged to be mounted within a nacelle with a mass of 1000 kg to 3000 kg, and optionally of 1500 kg to 2500 kg. The mass of the nacelle may be selected or adjusted to tune the FSN frequency.

A backward whirl frequency margin of:

$$\frac{\begin{array}{c}\text{the lowest frequency of either mode}\\ \text{Fan } RTW \text{ or Rotor } RW \text{ at the } MTO \text{ speed}\end{array}}{\text{the } MTO \text{ speed}}$$

may be in the range from 15 to 50%.

The LP rotor system may have a first forward whirl rotor dynamic mode, 1FW. A forward whirl frequency margin of:

$$\frac{\begin{array}{c}\text{the frequency difference between sychronous}\\ 1FW \text{ and the first engine order line at } MTO \text{ speed}\end{array}}{\text{the } MTO \text{ speed}}$$

may be in the range from 10 to 100%.

A mutual frequency margin of:

$$\frac{\begin{array}{c}\text{the frequency difference between mode}\\ \text{Fan } RTW \text{ and mode Rotor } RW \text{ at the } MTO \text{ speed}\end{array}}{\left(\begin{array}{c}\text{the lowest frequency of either mode Fan } RTW\\ \text{or Rotor } RW \text{ at the } MTO \text{ speed} + \text{the } MTO \text{ speed}\end{array}\right)}$$

may be in the range from 5 to 50%.

In any of the preceding aspects, one or more of the following features may apply:

A diameter of the fan may be in the range from 215 to 420 cm.

A diameter of the fan may be greater than or equal to 250 cm.

A mass of the fan may be in the range from 300 to 1000 kg.

A moment of inertia of the fan about the engine axis may be in the range from 100 to 600 kg·m².

The tilt stiffness of the fan shaft may be in the range from $5 \times 10^9$ to $12 \times 10^9$ N·mm/rad.

The radial bending stiffness of the front engine structure may be in the range from 80 to 180 kN/mm.

The engine may comprise a front engine structure arranged to support the fan shaft. A front engine structure cantilever distance defined as the distance between a forwardmost fan shaft bearing mounted on the front engine structure and a radial plane at the axial position along the front engine structure at which a front mount for the engine is located may be in the range from 800 to 1700 mm.

The fan shaft may be supported by two bearings. A length of the fan shaft between the bearings may be in the range from 900 to 1800 mm.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to an aspect, there is provided a method of operation of a gas turbine engine for an aircraft comprising: an engine core comprising a turbine, a compressor, and a core shaft connecting the turbine to the compressor; a fan system comprising a fan located upstream of the engine core, the fan comprising a plurality of fan blades and a fan shaft; and a gearbox; and a gearbox output shaft arranged to couple an output of the gearbox to the fan shaft, wherein the gearbox receives an input from the core shaft and outputs drive to the fan via the gearbox output shaft so as to drive the fan at a lower rotational speed than the core shaft, and wherein the fan system and the gearbox output shaft together form an LP rotor system having a first forward whirl rotor dynamic mode, 1FW.

The method comprises operating the engine such that a forward whirl frequency margin of:

$$\frac{\begin{array}{c}\text{the frequency difference between sychronous}\\ 1FW \text{ and the first engine order line at } MTO \text{ speed}\end{array}}{\text{the } MTO \text{ speed}}$$

is in the range from 10 to 100%.

The forward whirl frequency margin may be greater than 20%, 30%, 40%, or 50%, and/or optionally less than 90%, 80%, 70%, or 60%. The forward whirl frequency margin may be in an inclusive range bounded by any two of the values in the previous sentence (i.e. the values may form upper or lower bounds).

The method may comprise operating the engine at speeds up to a maximum take-off speed, MTO, of the engine. The method may comprise operating the engine at the MTO speed.

According to an aspect, there is provided a method of operation of a gas turbine engine for an aircraft comprising: an engine core comprising a turbine, a compressor, and a core shaft connecting the turbine to the compressor; a fan system having a reverse travelling wave first flap mode, Fan RTW, and comprising a fan located upstream of the engine core, the fan comprising a plurality of fan blades and a fan shaft; a gearbox and a gearbox output shaft arranged to couple an output of the gearbox to the fan shaft, wherein the gearbox receives an input from the core shaft and outputs drive to the fan via the gearbox output shaft so as to drive the fan at a lower rotational speed than the core shaft; wherein the fan system and the gearbox output shaft together form an LP rotor system having a first reverse whirl rotor dynamic mode, Rotor RW.

The method comprises operating the engine such that a mutual frequency margin of:

$$\frac{\text{the frequency difference between mode}}{\left(\begin{array}{l}\text{the lowest frequency of either mode Fan } RTW \\ \text{or Rotor } RW \text{ at the } MTO \text{ speed} + \text{the } MTO \text{ speed}\end{array}\right)}$$

is in the range from 5 to 50%.

The mutual frequency margin may be greater than 10%, 15%, 20%, or 25%, and/or optionally less than 45%, 40%, or 35%. The mutual frequency margin may be in an inclusive range bounded by any two of the values in the previous sentence (i.e. the values may form upper or lower bounds).

The method may comprise operating the engine at speeds up to a maximum take-off, MTO, speed of the engine. The method may comprise operating the engine at the MTO speed.

According to a aspect, there is provided a method of operation of a gas turbine engine for an aircraft comprising: an engine core comprising a turbine, a compressor, and a core shaft connecting the turbine to the compressor; a fan system having a reverse travelling wave first flap mode, Fan RTW, and comprising a fan located upstream of the engine core, the fan comprising a plurality of fan blades and a fan shaft; a front engine structure arranged to support the fan shaft, the front engine structure having a front engine structure nodding mode comprising a pair of modes at similar, but not equal, natural frequencies in orthogonal directions; and a gearbox and a gearbox output shaft arranged to couple an output of the gearbox to the fan shaft, wherein the gearbox receives an input from the core shaft and outputs drive to the fan via the gearbox output shaft so as to drive the fan at a lower rotational speed than the core shaft; wherein the fan system and the gearbox output shaft together form an LP rotor system having a first reverse whirl rotor dynamic mode, Rotor RW.

The method comprises operating the engine such that a front engine structure frequency margin of:

$$\frac{\begin{array}{c}\text{the frequency difference between} \\ \text{mode } FSN \text{ and the highest frequency of either} \\ \text{synchronous Fan } RTW \text{ or synchronous Rotor } RW\end{array}}{\begin{array}{c}\text{the lowest natural frequency of} \\ \text{the front structure nodding pair of modes}\end{array}}$$

is in the range from 5 to 50%.

The front engine structure frequency margin may be greater than 10%, 15%, 20%, or 25%, and/or optionally less than 45%, 40%, or 35%. The front engine structure frequency margin may be in an inclusive range bounded by any two of the values in the previous sentence (i.e. the values may form upper or lower bounds).

The method may comprise operating the engine at speeds up to a maximum take-off, MTO, speed of the engine. The method may comprise operating the engine at the MTO speed.

The engine of any of the preceding aspects may be used to perform the method of any of the preceding aspects.

In the various aspects and embodiments described above, the defined frequency margins may be arranged to remain within the defined ranges throughout normal operation of an aircraft which the engine is arranged to power.

The skilled person will appreciate that the most demanding conditions for engine vibration management may not occur around the maximum speeds (e.g. MTO speed), but rather in operating speed ranges around the speeds at which one or more of the FSN, Fan RTW and Rotor RW modes intersect the 1EO line.

The inventors appreciated that a geared turbofan engine with a large fan diameter and a rotor system that is cantilevered forward of the front engine mount introduces novel mass and stiffness characteristics and hence novel dynamic characteristics. The rotor stiffnesses and engine front engine structure stiffnesses may therefore be tuned in order to reduce or avoid frequency coincidence between natural frequencies and their potential excitation sources.

As used herein, a "large" fan diameter may mean a fan diameter greater than 216 cm (85 inches), and optionally greater than 250 cm (100 inches).

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust (for example maximum throttle) for the engine at International Standard Atmosphere (ISA) sea level pressure and temperature +15° C. with a fan inlet velocity of 0.25 Mn. A maximum take-off speed (MTO speed) is the rotational speed of the fan (and the attached fan shaft) under MTO conditions, and is measured in Hz (a frequency of rotation of the fan shaft).

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
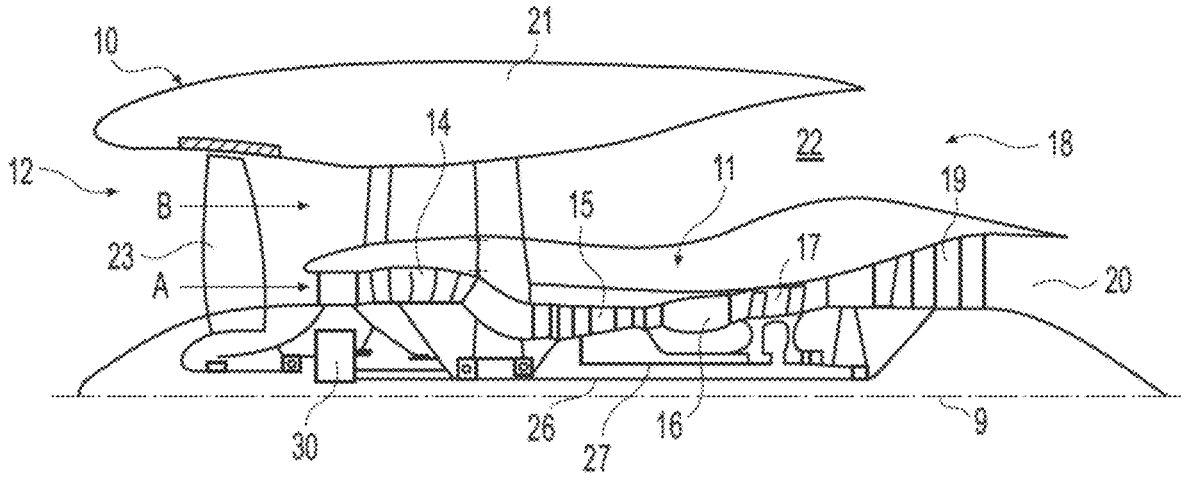
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two air-flows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
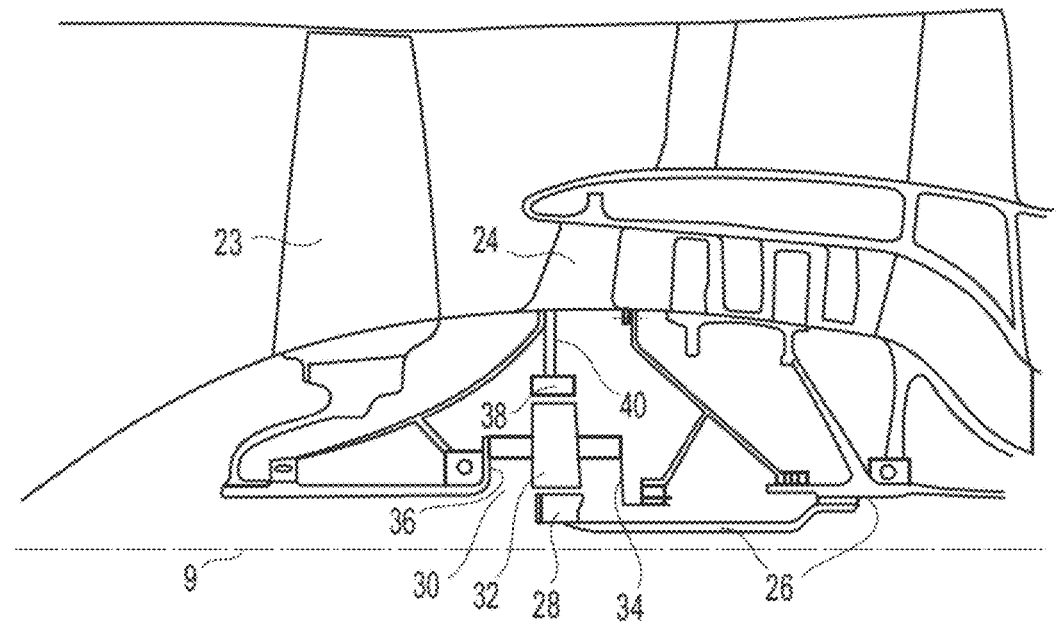
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
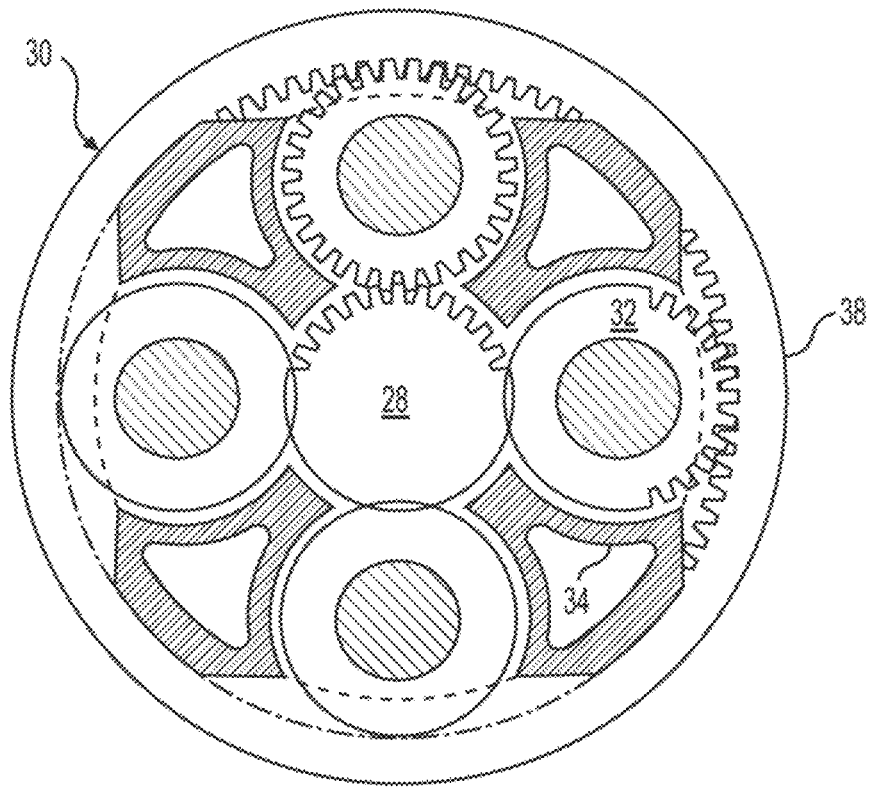
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. While the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The engine 10 is arranged to be mounted on a wing of an aircraft for use, by means of one or more mounts 41. In the arrangements being described, the engine 10 is surrounded by a nacelle 21, which surrounds the fan 23.

Figure 4:
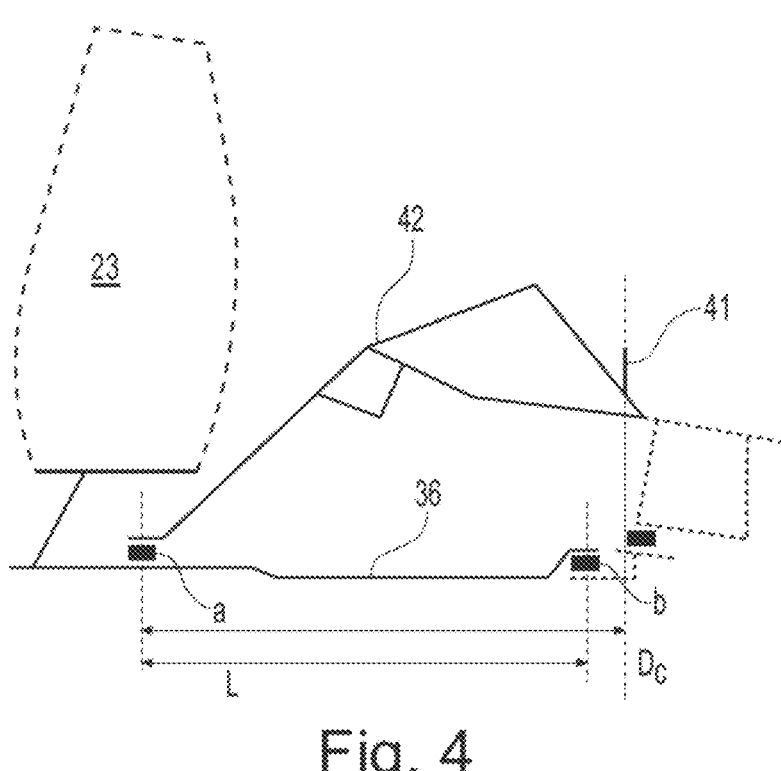
FIG. 4 is a sectional side view of a forward portion of a gas turbine engine.

In the example shown in FIG. 4 (in which figure the nacelle 21 is not visible), the front engine mount 41 (i.e. the forwardmost mount connecting the engine 10 to the wing, however many mounts there may be) may be described as a front core mount 41, as it connects the core 11 directly to the wing. In the alternative example shown in FIG. 5, the front mount 41 is a fan case front mount, instead of a core front mount, as it connects the fan case 45 to the wing of the aircraft (the fan case 45 generally being positioned immediately within the nacelle 21, around the axial location of the fan blade tips). The below description may apply equally to engines 10 with core mounts 41 and/or fan case mounts 41; the example with a core mount shown in FIG. 4 is chosen for discussion below by way of example only; the disclosure is not limited to such an arrangement.

The engine comprises a fan shaft 36 extending, in a geared engine 10, between a fan input position and a gearbox output position. In the arrangement shown in FIG. 14, the fan shaft 36 additionally extends rearward of the gearbox output position, with the additional fan shaft length providing options for fan shaft mounting rearward of the gearbox 30. The fan shaft 36 transmits drive from the gearbox 30 to the fan 23. The fan shaft 36 may be defined as the torque transfer component that couples the output of the gearbox 30 to the fan input. For the purposes of defining the stiffness of the fan shaft 36, it is considered to extend between a fan input position (i.e. the axial position of the connection of the fan 23 to the fan shaft 36) and a rear bearing b on the fan shaft 36 as described below.

In various arrangements, the fan shaft 36 is supported by two bearings—a first/forward bearing, a, located nearest the fan 23, and a second/rearward bearing, b, located rearward of the first bearing, a. The bearings a, b, limit radial movement of the shaft 36, so enforcing node positions for whirl modes of the fan shaft 36. In alternative arrangements, such as that shown in FIG. 14, the fan shaft 36 may be supported by more than two bearings—for example by three bearings. The bearings a, b are both (or all) located rearward of the fan input position; the rotor system comprising the fan 23 and fan shaft 36 may therefore be described as a cantilevered rotor system, as the fan 23 is only supported by a fan shaft 36 which is supported rearward of the axial location at which the fan 23 is connected to the fan shaft 36.

Figure 14:
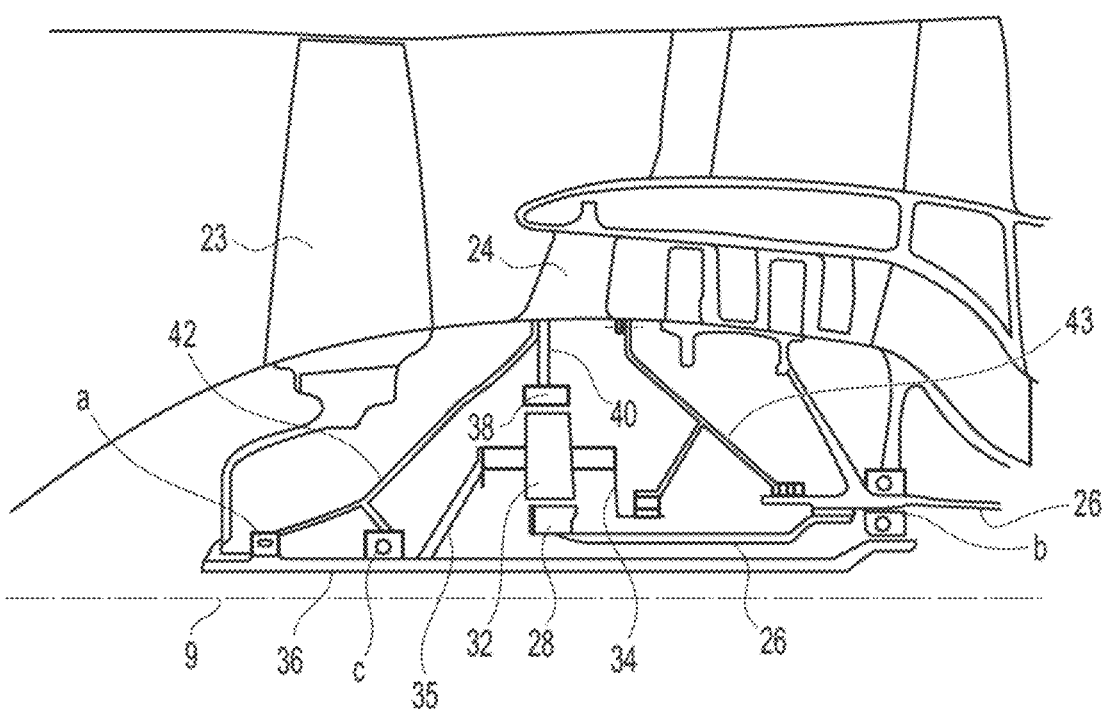
FIG. 14 is a sectional side view of a gas turbine engine similar to that shown in FIG. 1, but with a different fan shaft arrangement.

For the arrangements described in detail below, the fan shaft 36 extends rearwardly through the gearbox 30, as shown in FIG. 14. The additional length of the fan shaft 36 may serve to improve or facilitate axial location of the fan shaft 36. In the arrangement shown in FIG. 14, the gearbox 30 is a planetary gearbox, and the fan shaft 36 is therefore driven by a gearbox output shaft 35 connected to the planet carrier 34. The fan shaft 36 is therefore driven by the rotation of the planet carrier 34, and does not otherwise interact with the gearbox 30, despite passing through it. In an engine 10 with a star gearbox 30, the fan shaft 36 would instead be driven by the ring gear 38.

The forward bearing, a, on the fan shaft 36 of this arrangement is located near the fan 23, forward of the gearbox 30, and more specifically near (and rearward of) the fan input position, i.e. the connection between the fan shaft 36 and the fan 23. The forward bearing, a, is a roller bearing mounted to a static structure of the engine 10 (and more specifically in the example shown, generally rigidly connected to the static structure 24, including the fan outlet guide vane/engine stator). The rearward bearing, b, on the fan shaft 36 of this arrangement is located rearward of the gearbox 30. The rearward bearing, b, is a location bearing, serving to axially locate the fan shaft 36. Bearing b is an inter-shaft bearing in the arrangement shown; axially locating the fan shaft 36 with respect to the core shaft 26. An additional bearing axially locates the core shaft 26 within the engine 10.

In the arrangement shown in FIG. 14, a third bearing, c, is provided on the fan shaft 36, between bearings a and b. This bearing c is a catcher bearing provided for safety. In alternative arrangements, this bearing c may not be present. In various embodiments with more than two bearings on the fan shaft 36, the forwardmost bearing, nearest the fan 23, may be taken as bearing a and the rearmost bearing, furthest from the fan, as bearing b.

The engine 10 further comprises a front engine structure 42 and a power gearbox rear panel (PGB rear panel) 43.

The front engine structure 42 is substantially conical in shape in the arrangement shown in FIGS. 1 and 14, extending rearwardly and outwardly from the forward bearing, a, towards the engine section stator 24. It is rigidly mounted on the engine stationary structure 24 (in the arrangement shown, the engine section stator 24 is structural and forms a part of the engine stationary structure—in other arrangements, the engine stationary structure 24 may not include the engine section stator), and provides a mounting for the forward bearing a, and, where present, the intermediate bearing c. In the arrangement shown, the front engine structure 42 extends from an axial position forward of the gearbox 30 to an axial position along the length of the gearbox 30. The front engine structure 42 therefore provides some support to the fan 23, and also provides sealing and containment for the power gear box chamber 30, which generally contains an air/oil mist in operation. The forward bearing, a, is mounted on (or an integral part of) the front engine structure 42.

The PGB rear panel 43 may play a role in sealing and locating the gear box 30; it may additionally provide a rotor dynamic function to the intermediate pressure compressor 14. The PGB rear panel 43 is substantially conical in shape in the arrangement shown in FIGS. 1 and 14, extending rearwardly and inwardly from a position near the engine section stator 24 towards the rearward bearing, b. The PGB rear panel is rigidly mounted on the engine stationary structure 24 (in the arrangement shown, the engine section stator 24 is structural and forms a part of the engine stationary structure—in other arrangements, the engine stationary structure 24 may not include the engine section stator). In the arrangement shown, the PGB rear panel 43 extends from an axial position along the length of the gearbox 30 to an axial position rearward of the gearbox 30.

The PGB rear panel 43 therefore provides some support to the fan shaft 36, via the core shaft 26, and also provides sealing and containment on the rearward side of the power gear box chamber 30, which generally contains an air/oil mist in operation.

The front engine structure 42 and the PGB rear panel 43 together form an enclosure around the gearbox chamber 30a, shielding the rest of the engine 10 from the air/oil mist generally generated by the gearbox 30 in operation. The front engine structure 42 and the PGB rear panel 43 are arranged not to rotate with the fan shaft 36, and may therefore be referred to as parts of the static structure of the engine 10.

For ease of discussion herein:

a "fan system" is defined as comprising the fan 23 (fan blades and hub) and the fan shaft 36; and a "low pressure rotor system" (LP rotor system) is defined as comprising all components 23, 36 of the fan system, and additionally the gearbox output shaft 35 that drives the fan shaft 36 (in the arrangement shown in FIG. 14, the gearbox output shaft 35 is the carrier output shaft, as it is a planetary gearbox 30).

Engine Vibrational Modes

Figure 5:
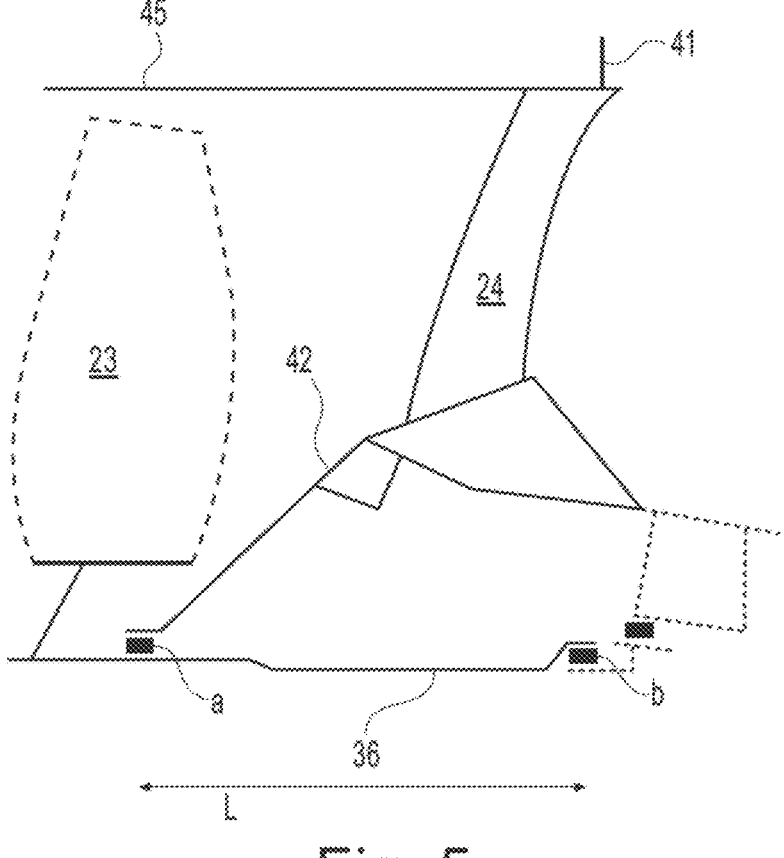
FIG. 5 is a sectional side view of a forward portion of a gas turbine engine different from that shown in FIG. 4.

FIGS. 4 and 5 each illustrate a forward portion of a geared turbine engine 10, with a relatively large-diameter fan 23, for example having a fan diameter greater than or equal to 215 cm, and optionally greater than or equal to 250 cm. The fan 23 is located forward of the front engine mount 41 in a cantilevered mounting arrangement (i.e. the fan shaft 36 is supported on only one side of the mounting position of the fan 23, namely rearward of the axial position at which the fan 23 is connected to the fan shaft 36, such that the fan shaft 36 may be treated as a cantilevered beam).

An engine 10 of this type may generally have three natural frequencies (modes) of interest that may be coincident or near-coincident in frequency. These modes are:

1) The first nodding (bending) mode of the front engine structure 42 (FSN);

2) The reverse travelling wave (RTW) first flap mode of the fan 23 system (Fan RTW); and 3) The first reverse whirl (RW) rotor dynamic mode of the LP rotor system (Rotor RW).

Figure 6:
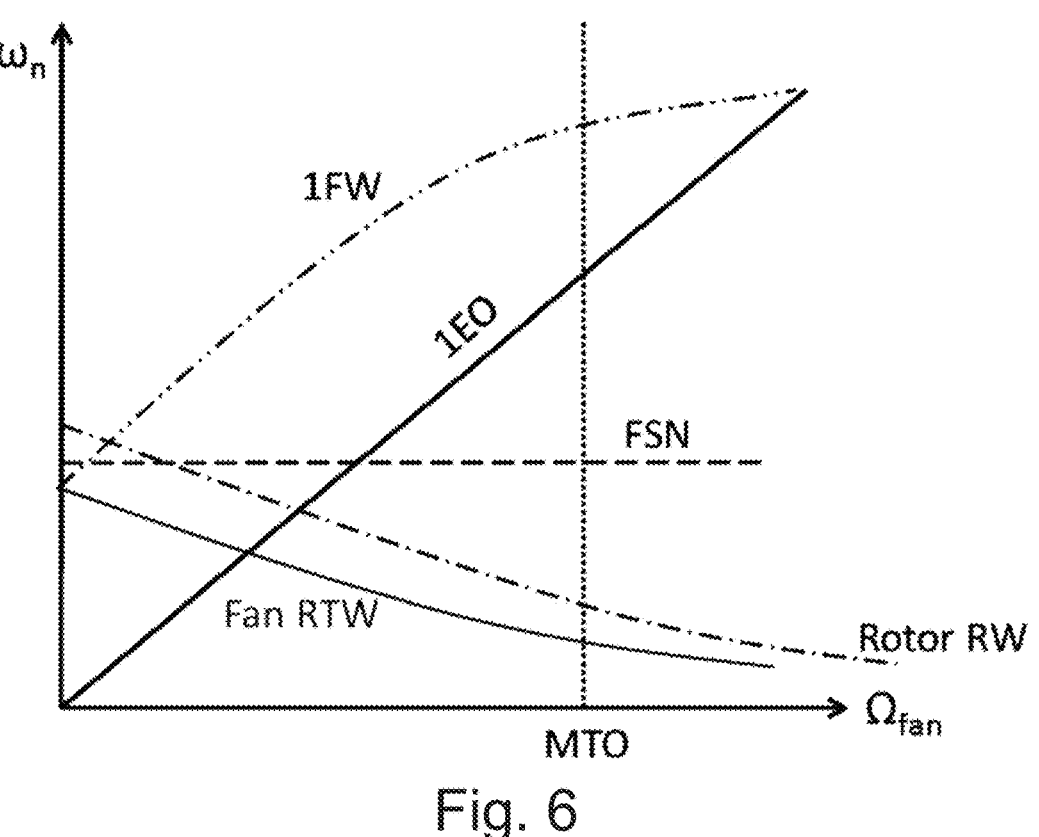
FIG. 6 is a Campbell diagram in the inertial reference frame, illustrating various vibrational modes.

FIG. 6 provides a Campbell diagram in the inertial reference frame, showing various vibrational modes.

As discussed herein, rotational frequency values are not directional-frequencies are all given as absolute (positive) values, irrespective of rotation direction. Similarly, all frequency differences are provided as positive values, with whichever frequency of the pair to be compared has the lowest absolute value subtracted from whichever frequency has the highest absolute value. All of the vibrational modes described are the lowest order vibrations of their respective type (the fundamental)—higher frequency harmonics may also be present, but in various aircraft designs including those of the examples being described the fundamentals are of particular interest as several of these first order modes are near-coincident with each other and/or close to forcing frequencies (unbalance or aerodynamic) likely to be present in use. The near-coincidence and/or forcing can amplify the vibrational responses. In addition, the skilled person would appreciate that, whilst higher order vibrations of the same type have smaller amplitudes than the lower order vibrations and are therefore often less important from the perspective of their effect on the engine 10, they could present a hazard if forced and/or if near-coincident.

The first nodding (bending) mode of the front engine structure 42 may be called the Front engine Structure Nodding mode, and referred to as FSN. The FSN line is shown as a dashed line in FIGS. 6 to 8. The first nodding mode of the front engine structure 42 (FSN) is illustrated schematically in FIG. 17. The whole of the front engine structure 42 bends, or "nods", forward of the position of the rear bearing, b, and the front mount 41. It will be appreciated that FIG. 17 (and correspondingly also FIGS. 16 and 18) are intended to demonstrate the mode-shape of the relevant mode, but that the displacement is exaggerated for clarity of demonstration.

Figure 18:
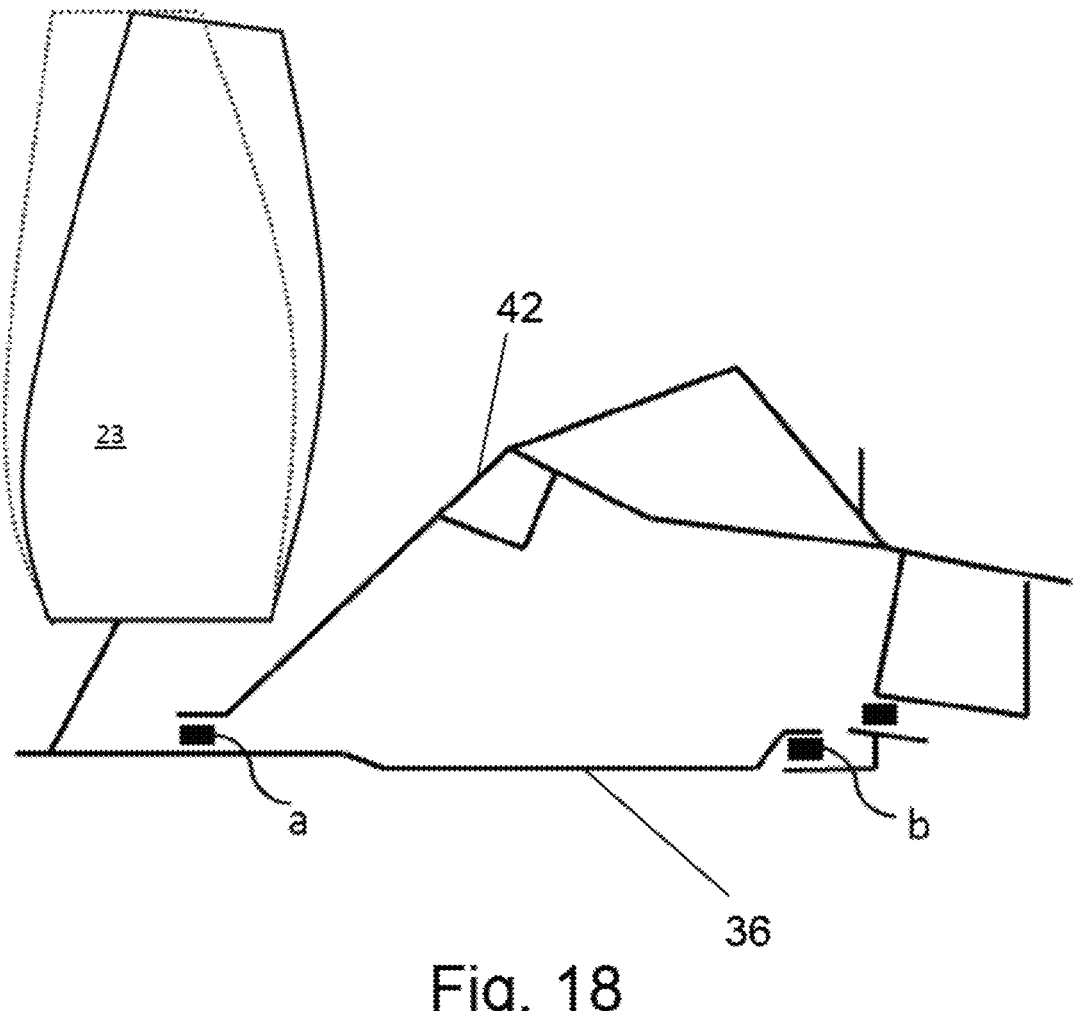
FIG. 18 schematically illustrates the reverse travelling wave (RTW) first flap mode of a fan system (Fan RTW).

The reverse travelling wave first flap mode of the fan 23 is an example of a Backward Whirl mode of the fan, and may be referred to as Fan RTW. The skilled person would appreciate that the fan 23 inherently has some flexibility, as required to exhibit Fan RTW vibrations, and may therefore be referred to as a flexible fan 23. The Fan RTW line is shown as a solid dark grey line in FIGS. 6 to 8. The Fan RTW mode is mostly composed of movement of the fan blades, with only a small contribution from the fan shaft 36. FIG. 18 schematically illustrates the reverse travelling wave (RTW) first flap mode of a fan system 23, 36 (Fan RTW). As illustrated by the figure, the movement of the fan shaft 36 is smaller than that of the fan blades 23, and indeed is often negligible.

The first reverse whirl rotor dynamic mode of the fan shaft 36 is another example of a Backward Whirl mode, and may be referred to as Rotor RW. The Rotor RW line is shown as a dot-dashed black line in FIGS. 6 to 8. The Rotor RW mode is mostly composed of bending of the fan shaft 36, with some contribution from fan blade flex.

The two vibration modes described above, Fan RTW and Rotor RW, are therefore both "backward whirl" (or "reverse whirl") modes: i.e. the direction of the whirl is opposite to the direction of rotation of the rotor system 23, 36. In the example shown in FIG. 6, the lowest frequency reverse whirl mode is the reverse travelling wave first flap mode (Fan RTW) of the flexible fan 23. The second lowest frequency reverse whirl mode is the first reverse whirl rotor dynamic mode (Rotor RW) of the fan shaft 36. However the opposite may occur in other arrangements (i.e. Rotor RW may have a lower frequency than Fan RTW).

The Campbell Diagram (FIG. 6) also shows the synchronous line, 1EO, which may also be referred to as the first engine order line. Line 1EO represents the fan shaft speed operating line, and is shown as a solid black line in FIGS. 6 to 8. FIG. 6 therefore illustrates coincidence between natural frequencies, $\omega_n$, of the modes FSN, Fan RTW and Rotor RW, and the engine fan shaft speed (forcing frequency) $\Omega_{fan}$, at the intersections of the mode lines with line 1EO.

If the rotor first reverse whirl mode (Rotor RW) and/or the reverse travelling wave first fan blade flap mode (Fan RTW) have an insufficient frequency margin above the maximum fan shaft rotation speed (i.e. if the mode frequencies are too similar to the maximum fan shaft rotation frequency/if there is not enough of a difference in frequency between them), either or both of these modes can be excited by a forcing load that is static in the inertial reference frame (as viewed by an outside observer viewing the engine 10). Examples of such forcing include aerodynamic loads on the fan blades 23, and fan blade tip rubs.

If the frequency margin were zero (i.e. if the mode frequency were equal to maximum fan shaft rotation frequency), the reverse travelling wave of the fan 23 and/or the rotor response would be stationary in the inertial reference frame, and hence a stationary aerodynamic load or fan blade tip rub could rapidly increase the response amplitude to damaging/hazardous levels.

A frequency margin, referred to as the backward whirl frequency margin, may therefore be tuned appropriately to avoid this response amplification.

The maximum fan speed (i.e. MTO fan speed) is considered for establishing this frequency margin because at lower rotor speeds the first reverse whirl mode (Rotor RW) and reverse travelling wave first fan blade flap mode (Fan RTW) have higher frequencies in the inertial reference frame, while the rotor speed is lower. The maximum rotor speed condition is therefore always the condition in which the lowest backward whirl frequency margin occurs in engines 10 as described.

Figure 7:
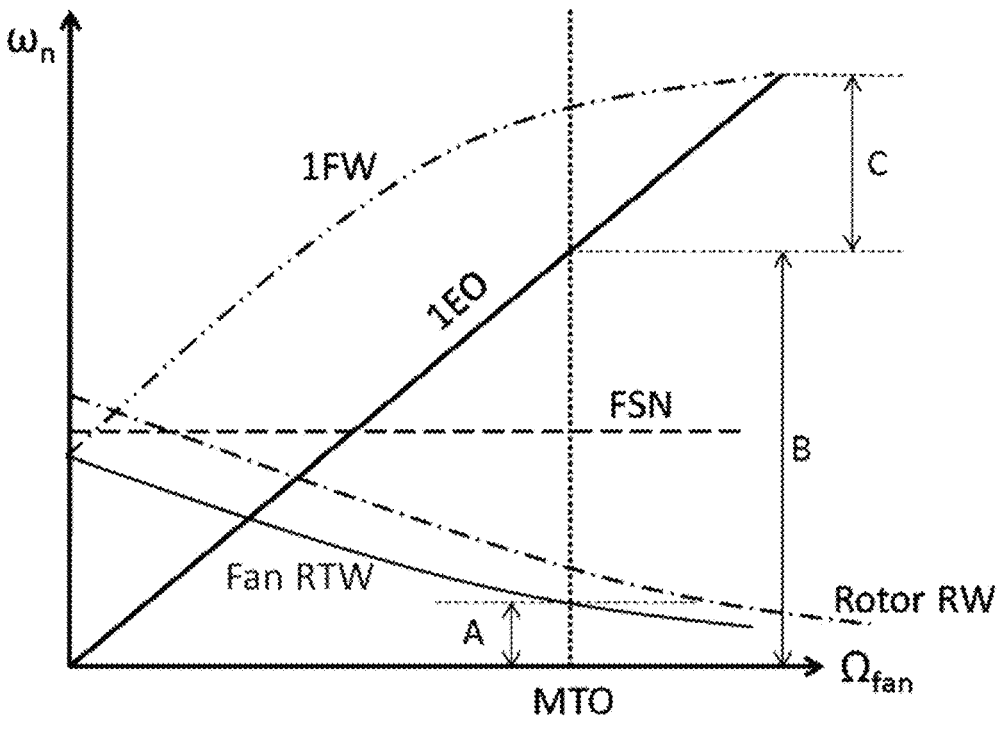
FIG. 7 is the Campbell diagram of FIG. 6 with parameters A, B and C marked.

A first parameter, A, is defined as the lowest frequency of either mode Fan RTW or Rotor RW at the Maximum Take-Off (MTO) speed. In the example shown in FIG. 6, a line corresponding to the MTO speed (vertical dotted line) has been added to the Campbell Diagram for ease of determining this parameter. For the example shown, Fan RTW is lower than Rotor RW, and the value for the Fan RTW mode line where it intersects the MTO line is therefore taken as the value for parameter A, as shown in FIG. 7.

A second parameter, B, is defined as being equal to the MTO speed. The MTO speed is a rotational speed of the fan 23 and shaft 36, and is therefore defined in terms of a frequency—i.e. as a frequency of rotation—for ease of comparison with the other frequencies described herein.

The backward whirl frequency margin is expressed as A/B. The backward whirl frequency margin A/B may be maintained within the range from 15% to 50%, and preferably greater than 25%, in various arrangements.

If the rotor first reverse whirl mode (Rotor RW) and reverse travelling wave first fan blade flap mode (Fan RTW) have an insufficient mutual frequency margin (i.e. if they are too close to each other in frequency), these modes can interact such that any forcing as described above may excite both of these modes instead of just one. This may again lead to deleterious increased amplitudes of vibrational responses.

Figure 8:
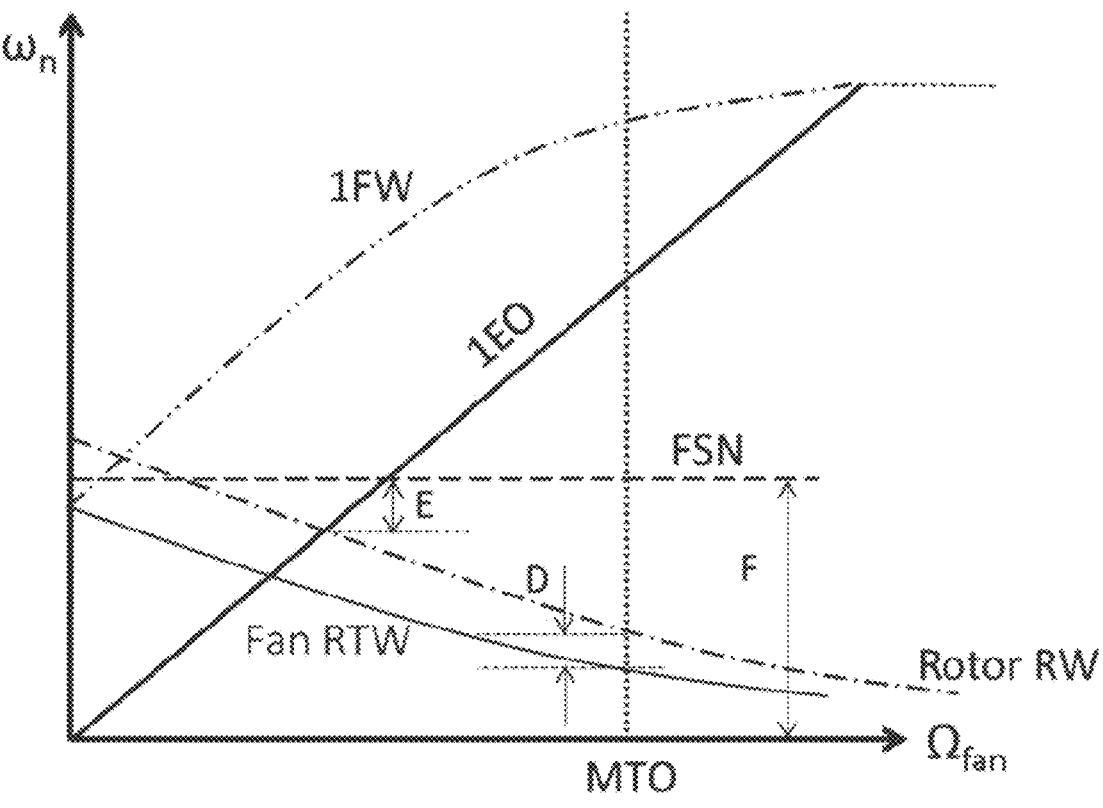
FIG. 8 is the Campbell diagram of FIG. 6 with parameters D, E and F marked.

A parameter, D, may be defined as the frequency difference between the modes Fan RTW and Rotor RW at MTO, as marked on FIG. 8. This is measured as the difference in frequency between the intersection of the line for Fan RTW and MTO, and the intersection of the line Rotor RW and MTO.

The mutual frequency margin may then be expressed as D/(A+B). The frequency margin D/(A+B) may be maintained within the range from 5% to 50% and preferably greater than 10%, in various arrangements. The front engine structure nodding mode (FSN) is a mode of a portion of the static structure, the static structure being the part of the engine 10 arranged not to rotate relative to an aircraft or other structure on which the engine is mounted in use (i.e. not to rotate with any of the shafts 26, 36, fan 23 or turbines 19 in use).

The FSN mode can be directly excited by rotor unbalance such as unbalance of the fan 23 and/or fan shaft 36. The response to unbalance may be amplified if the rotor unbalance at the forcing frequency (fan rotational speed, for example measured as a rotation frequency) is coincident with the natural frequency of the FSN mode. The amplification may remain small provided that mode FSN does not have a frequency coincident, or near coincident, with the frequency of Fan RTW or Rotor RW. However, the vibration amplitude may be deleteriously increased if the FSN mode frequency is close to the frequency of Fan RTW or Rotor RW.

The frequency of the FSN mode depends on the stiffness of various structures 42, 24 which directly and/or indirectly support the fan shaft 36, and in particular on the stiffness of the front engine structure 42. In various embodiments, the main stiffness path to the front mount plane (a) from the fan 23 may be up through the front engine structure 42, including the engine section stator 24.

In general, the stiffness of the front engine structure 42 may not be radially symmetrical—for example not being equal in orthogonal directions due to a non-axisymmetric engine mount arrangement. As a result the front engine structure nodding (FSN) mode is generally composed of a pair of modes at similar, but not equal (for example being separated by 0-10% only, e.g. by 2 Hz), natural frequencies in orthogonal directions in such examples. This combination of orthogonal modes may cause the front engine structure vibration response to rotor unbalance to be elliptical in orbit, and therefore the rotor (fan 23 and fan shaft 36) housed in the front engine structure 42 may be forced by an elliptical orbit at its bearing supports a, b. The elliptical orbit may comprise both forward and reverse travelling wave components; a mechanism is therefore presented to excite reverse whirl modes Fan RTW or Rotor RW if they are coincident or near-coincident with the FSN frequency. This combined effect could rapidly increase the vibration response amplitude to nuisance levels, or in extreme cases to potentially damaging/hazardous levels. A front engine structure frequency margin may therefore be tailored to avoid this amplification mechanism.

A parameter, E, is defined as the frequency difference between mode FSN and the highest frequency mode of Fan RTW and Rotor RW at their respective synchronous natural frequencies, as shown in FIG. 8. In the example shown in FIG. 8, Rotor RW is higher than Fan RTW, so the frequency difference between the Rotor RW line where it crosses 1EO and the FSN line is used. If Fan RTW were higher than Rotor RW, the frequency difference between the Fan RTW line where it crosses 1EO and the FSN line would be used.

A parameter, F, is defined as the lowest natural frequency of the front engine structure nodding pair of modes (FSN), as shown in FIG. 8. On the Campbell Diagram, the FSN line shown is for the lowest natural frequency of the front engine structure nodding pair of modes.

The front engine structure frequency margin is expressed as E/F. The front engine structure frequency margin E/F may be maintained within the range from 5% to 50%, and preferably greater than 10%, in various arrangements.

In axisymmetric engine mount arrangements, the FSN mode may be composed of only a single mode, reducing or avoiding this excitation pathway; consideration of the front engine structure frequency margin may be less important, or even unnecessary, in such arrangements.

The FSN mode may tend to move, and potentially bend, a nacelle 21 within which the engine is mounted. A mass of the nacelle 21 may therefore be considered in tuning the front engine structure frequency margin, E/F. For example, the nacelle mass may be selected to be within the range of 1000 kg to 3000 kg, and optionally 1500 kg to 2500 kg. In general, the frequency of the FSN mode may reduce in proportion to the ratio of the nacelle 21 modal mass to the engine 10 modal mass, where the modal mass is calculated as the mass that participates by way of kinetic energy contribution to the total energy in the FSN mode. For example, a geared turbine engine 10 with a relatively large fan diameter and no nacelle may exhibit a FSN mode at 26 Hz. The same engine 10 mounted within a nacelle with a mass of 1500 kg, may exhibit a FSN mode at 20 Hz. The same engine 10 mounted within a nacelle with a mass of 2500 kg, may exhibit a FSN mode at 16 Hz. It will be appreciated that these values are provided by way of illustrative example only, and are not intended to be limiting.

A geared turbine engine 10 of the type with a relatively large fan diameter and a rotor that is cantilevered forward of the front engine mount 41, as shown in FIGS. 4 and 5, may additionally have a natural frequency (mode) of interest at a higher frequency. This mode may be formed by a combination of two forward whirl (FW) modes:

1) The forward travelling wave first flap mode of the (flexible) fan 23 system (Fan FTW); and
2) The first forward whirl rotor dynamic mode of the LP rotor system (Rotor FW).

The two vibration modes described above. Fan FTW and Rotor FW, are both "forward whirl" modes: i.e. the direction of the whirl is the same as the direction of rotation of the fan and LP rotor system 23, 36.

On the Campbell Diagram in the inertial reference frame (FIG. 6), a forward whirl mode is identified as 1FW (1st Forward Whirl), and marked with a dot-dot-dashed line. 1FW may be described as a combined shape mode in that it has attributes of both the forward travelling wave first fan flap mode (Fan FTW) shape as well as the first forward whirl rotor dynamic mode shape of the fan shaft (Rotor FW).

Figure 16:
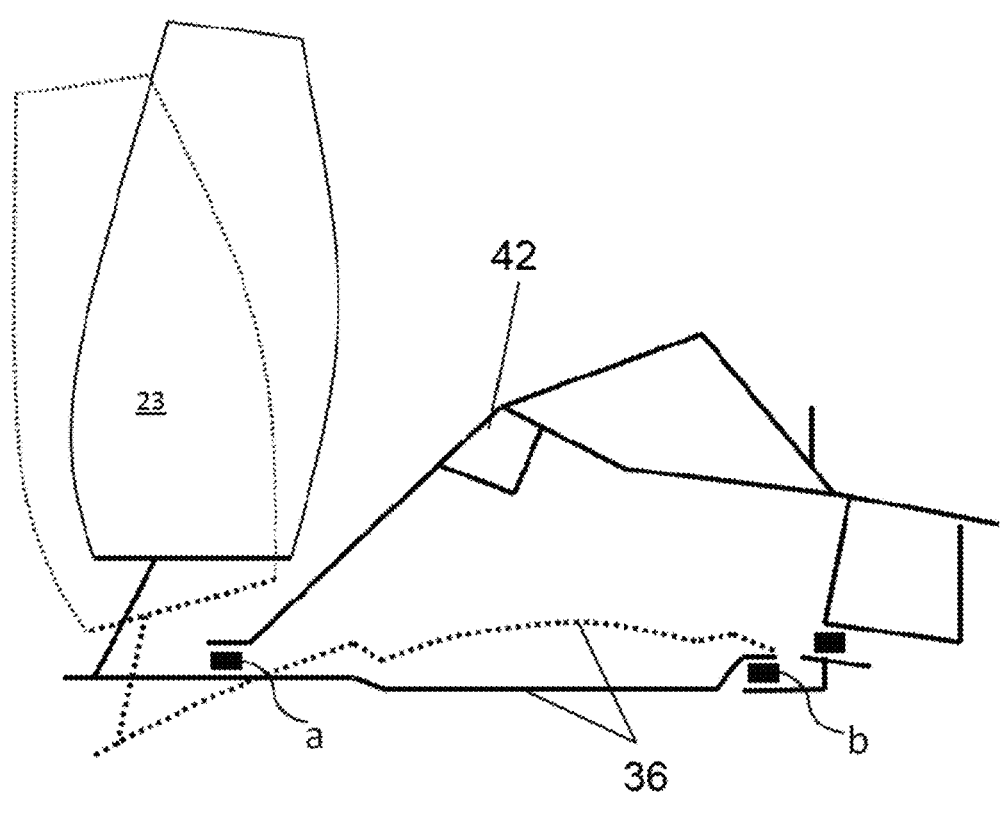
FIG. 16 schematically illustrates whirl modes of the fan and fan shaft (Rotor RW, 1FW, Fan FTW, Rotor FW)
Figure 17:
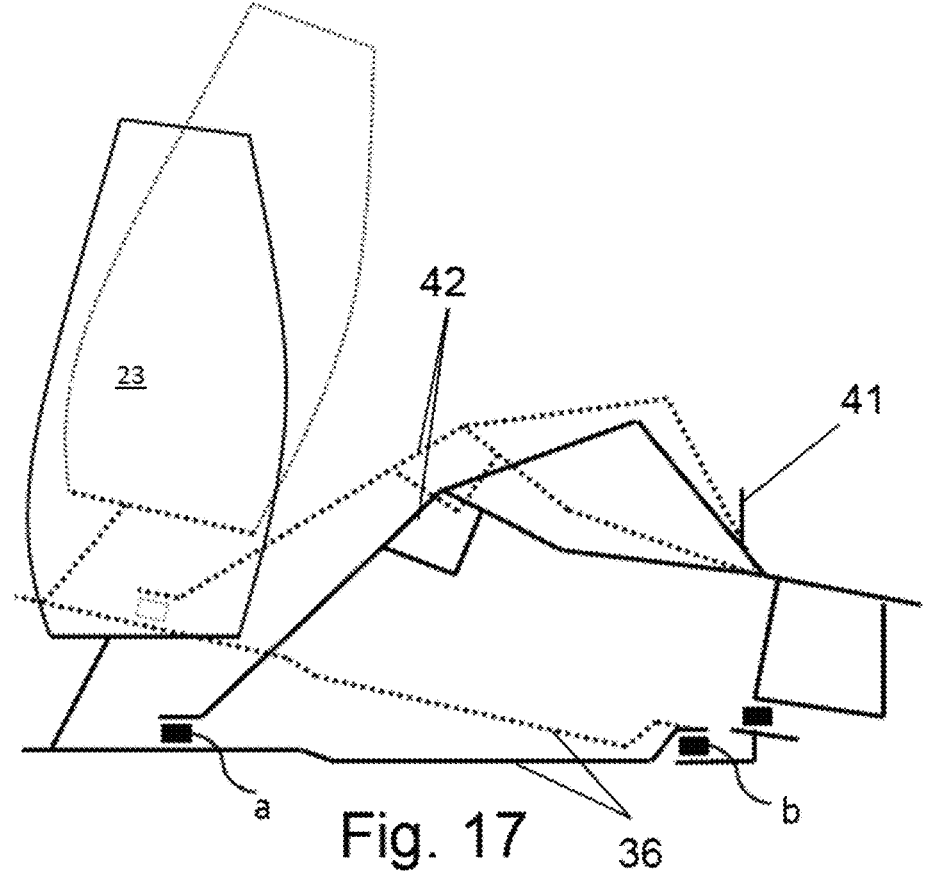
FIG. 17 schematically illustrates the first nodding (bending) mode of a front engine structure (FSN)

FIG. 16 schematically illustrates the whirl modes of the fan 23 and fan shaft 36 (Rotor RW, 1FW, Fan FTW, Rotor FW). it will be appreciated that the mode shape is generally the same for forward and reverse whirl modes, with the difference being the rotation direction of the whirl-forward whirl modes rotate in the same direction as the shaft 36 whereas reverse whirl modes rotate in the opposite direction to the shaft 36.

If the rotor first forward whirl mode (1FW) has insufficient frequency margin above the maximum fan speed (MTO speed), this mode can be excited by unbalance on the rotor 23, 36, for example by unbalance of the fan 23. A high balance quality and/or control of the rotor dynamic response may be provided by the introduction of damping to prevent a high vibration response. The consequence of failing to prevent a high vibration response would be that vibrations of the rotor 23, 36 may cause nuisance, impose component life limitations, and/or require frequent fan trim balance operations. In some cases the response amplitude could increase to damaging or hazardous levels.

A frequency margin, referred to as the forward whirl frequency margin, may therefore be tuned appropriately. A parameter, C, is defined as the frequency difference between the intersection of 1FW with the synchronous (first engine order) line 1EO, and the intersection of MTO with 1EO, as shown on FIG. 7.

The forward whirl frequency margin is expressed as C/B, where B is the maximum take-off speed (MTO speed), which is defined in terms of the frequency of rotation, as described above. The forward whirl frequency margin C/B may be maintained within the range from 10% to 100%, and preferably greater than 30%, in various arrangements.

To summarise, four frequency margins are defined herein:

TABLE 1

Frequency Margins

| Name | Definition | Range |
|---|---|---|
| Backward whirl frequency margin | A/B | 15% to 50%, optionally greater than 20%, 25%, 30%, or 35%, and optionally less than 45%, or 40% |
| Forward whirl frequency margin | C/B | 10% to 100%, optionally greater than 20%, 30%, 40%, or 50%, and optionally less than 90%, 80%, 70%, or 60% |
| Mutual frequency margin | D/(A + B) | 5% to 50%, optionally greater than 10%, 15%, 20%, or 25%, and optionally less than 45%, 40%, or 35% |
| Front engine structure frequency margin | E/F | 5% to 50%, optionally greater than 10%, 15%, 20%, or 25%, and optionally less than 45%, 40%, or 35% |

In various arrangements, A/B≥25%, C/B≥30%, D/(A+B)≥10%, and E/F≥10%.

The following six parameters, easily obtainable from a Campbell Diagram as illustrated in FIGS. 6 to 8, are used to calculate the frequency margins:

TABLE 2 parameters

| Name | Definition | Range |
|---|---|---|
| A | the lowest frequency of either mode Fan RTW or Rotor RW at Maximum Take-Off Speed | 4 Hz to 22 Hz, optionally 5 Hz to 15 Hz, and further optionally 6 Hz to 10 Hz |

TABLE 2-continued parameters

| Name | Definition | Range |
|---|---|---|
| B | Maximum Take-Off (MTO) speed | 25 Hz to 45 Hz, optionally 25 Hz to 30 Hz, e.g. for an engine with a large fan diameter (greater than 216 cm-85 inches), or optionally 35 Hz to 45 Hz, e.g. for an engine with a smaller fan diameter |
| C | the frequency difference between the intersection of 1FW with 1EO and the intersection of MTO with 1EO | 8 Hz to 45 Hz, optionally 20 Hz to 40 Hz, and further optionally 25 Hz to 35 Hz |
| D | the frequency difference between mode Fan RTW and mode Rotor RW at MTO | 2 Hz to 15 Hz, optionally 5 Hz to 15 Hz, and further optionally 5 Hz to 8 Hz |
| E | the frequency difference between mode FSN and the highest frequency mode of Fan RTW and Rotor RW at their respective synchronous natural frequencies | 2 Hz to 15 Hz, optionally 2 Hz to 10 Hz, and further optionally 3 Hz to 5 Hz |
| F | the lowest natural frequency of the front engine structure nodding pair of modes (FSN) | 14 Hz to 26 Hz, optionally 15 Hz to 25 Hz, and further optionally 18 Hz to 22 Hz |

All of these parameters have the units of frequency—Hz—and all the frequency margins are therefore dimensionless.

In various arrangements, one, some, or all of the four frequency margins described may be maintained within the specified ranges. Various engine properties may be controlled so as to adjust vibrational properties, including the following. The skilled person would appreciate that the engine 10 may be tuned so as to allow the frequency margin(s) to lie within the specified ranges in a variety of different ways, as multiple parameters affect engine vibrational properties. The below examples of engine properties are therefore provided by way of example only.

In particular, the inventors appreciated that tuning of the fan 23 stiffness, fan shaft 36 stiffness, and/or the engine front engine structure 42 stiffness may allow or facilitate the avoidance of frequency coincidence between natural frequencies and their potential excitation sources.

The fan diameter may be greater than or equal to 215 cm (85") or 250 cm (100"), and optionally may be selected to be in the range from 215 cm to 420 cm or from 250 cm to 370 cm (100" to 145"). The same fan size may be used for both composite and metallic fan blades 23.

The fan mass (the mass of the fan 23, including the hub) may be in the range from 300 to 1000 kg.

The fan moment of inertia (the moment of inertia of the fan 23, including the hub) about the longitudinal engine axis may be in the range from 100 to 600 kg·m².

The fan shaft length, L, defined between the forward bearing a and the rearward bearing b as shown in FIGS. 4 and 5, may be in the range from 900 mm to 1800 mm. The fan shaft length, L, may be defined between the axial centre-points of the bearings a, b. In arrangements with more than two bearings on the fan shaft 36, L may be defined between the fan shaft bearing closest to the fan 23 and the fan shaft bearing furthest from the fan 23.

The front engine structure cantilever distance, Dc, defined as the distance between the radial plane of the front mount 41 (the front mount plane) to the forward bearing, a, as shown in FIG. 4 may be in the range from 800 mm to 1700 mm. The front engine structure cantilever distance, Dc, may be defined between the axial centrepoint of the forward bearing a, and the axial centrepoint of the front mount 41 (i.e. the front mount plane is located at the axial centre point of the front mount 41).

Radial Bending Stiffness

Figure 9:
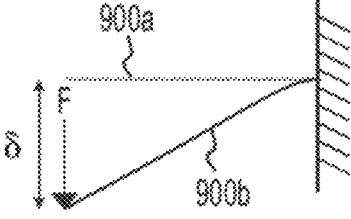
FIG. 9 is a schematic diagram illustrating radial bending stiffness of a shaft.

A radial bending stiffness is defined with reference to FIG. 9 in terms of the deformation of a cantilevered beam 900, which moves between a first position 900a and a second position 900b on the application of a force. As illustrated in FIG. 9, a force, F, applied at the free end of the beam 900a in a direction perpendicular to the longitudinal axis of the beam causes a linear perpendicular deformation, δ, seen in the second position 900b. The radial bending stiffness is the force applied for a given linear deformation i.e. F/δ. In the present application, the radial direction is relative to the rotational axis 9 of the engine 10, and so relates to the resistance to linear deformation in a radial direction of the engine caused by a radial force. The beam 900, or equivalent cantilevered component, extends along the axis of rotation of the engine, the force, F, is applied perpendicular to the axis of rotation of the engine 10, along any radial direction, and the displacement, δ, is measured perpendicular to the axis of rotation, along the line of action of the force, F. The radial bending stiffness as defined herein has SI units of N/m, and may be scaled to alternative units such as kN/mm. In the present application, unless otherwise stated, the radial bending stiffness is taken to be a free-body stiffness i.e. stiffness measured for a component in isolation in a canti-lever configuration, without other components present which may affect its stiffness.

Figure 10:
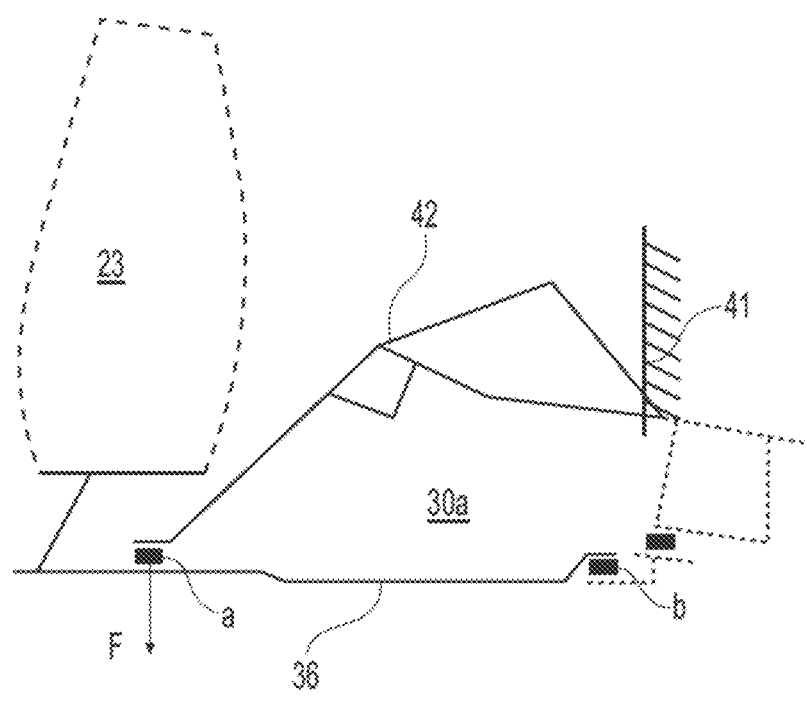
FIG. 10 is a sectional side view of a forward portion of a gas turbine engine as shown in FIG. 4, illustrating how radial bending stiffness of the front engine structure is determined.

The determination of the radial bending stiffness of the front engine structure 42 is described with respect to FIG. 10. The front engine structure 42 is considered in isolation (i.e. without the fan shaft 36 and other components), and the deflection in response to a radial shear force, F, applied to the front engine structure 42 at the axial centrepoint of the forward bearing, a, is determined, with the engine static structures earthed (i.e. treated as rigid/not moving) at the radial plane of the front mount 41.

The deflection, δ, is measured in line with the applied force, F, at the centerline of the forward bearing, a. Diagonal lines are used to indicate that the structure is held to be rigid in a radial plane aligned with the front engine mount 41—the bending of the structure forward of this connection is measured.

In engines 10 with a non-axisymmetric engine mount 41 arrangement, the radial bending stiffness of the front engine structure 42 may not be equal in orthogonal directions. Measurements may therefore be taken at, or calculations performed for, multiple positions, e.g. two orthogonal positions, and the lowest value may be provided for the radial bending stiffness of the front engine structure 42. In the example being described, a mounting of the front engine structure 42 may provide an obvious asymmetry and mea-surements may therefore be taken in line with the mount and perpendicular to the mount, for example. The lowest stiff-ness may generally correspond to the lowest FSN frequency, which may be of interest for the minimum frequency sepa-ration to Fan RTW or Rotor RW mode.

The front engine structure radial bending stiffness may be in the range from 80 to 180 kN/mm.

Tilt Stiffness

Figure 11:
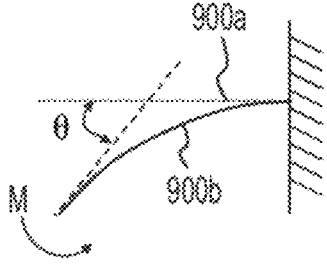
FIG. 11 is a schematic diagram illustrating tilt stiffness of a shaft.

A tilt stiffness is defined with reference to FIG. 11, which shows the resulting deformation of a cantilevered beam 900 from a first position 900a to a second position 900b under a moment M applied at its free end. The tilt stiffness is a measure of the resistance to rotation of a point on the component at which a moment is applied. As can be seen in FIG. 11, an applied moment at the free end of the cantile-vered beam causes a constant curvature along the length of the beam between its free and fixed ends. The applied moment M causes a rotation θ of the point at which it is applied. The tilt stiffness as defined herein therefore has SI units of Nm/rad., and may be scaled to alternative units such as N·mm/rad.

Figure 12:
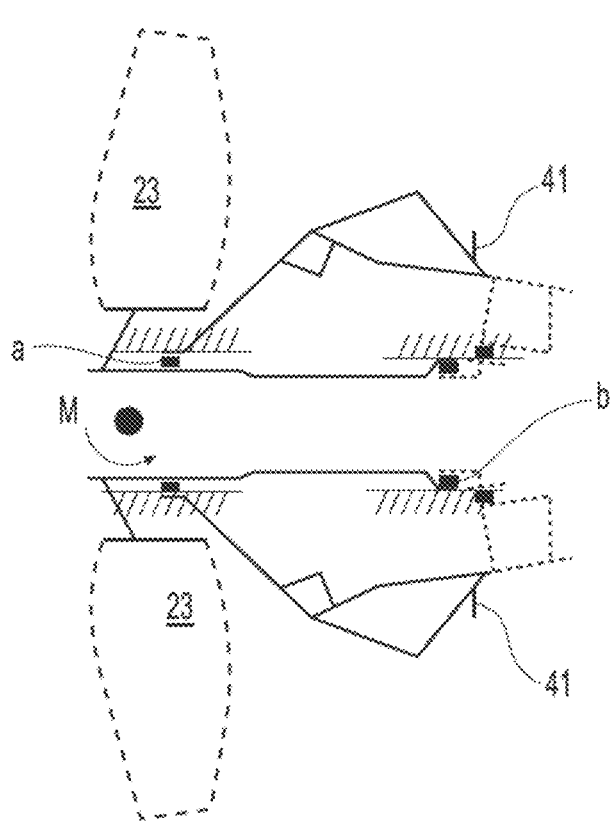
FIG. 12 is a sectional side view of a forward portion of a gas turbine engine as shown in FIG. 4, illustrating how tilt stiffness of the fan shaft is determined.

The determination of the tilt stiffness of the fan shaft 36 is described with respect to FIG. 12. Diagonal lines are used to indicate that the fan shaft 36 is held to be pinned at the bearings a and b—the bearings a, b, are treated as rigid. The shaft 36 is treated as being pinned at the bearings a,b, as this is representative of the boundary conditions when installed in the engine 10. In arrangements with more than two bearings on the fan shaft 36, the fan shaft 36 may be held to be pinned at all such bearings.

The moment, M, is applied around a rotation axis oriented along a radius of the engine 10 and at the axial position of the centre of gravity (CoG) of the fan assembly (i.e. the CoG of the fan 23, and not including the fan shaft 36). The rotation axis of the tilt moment, M, extends into the page as drawn in FIG. 12. The fan assembly CoG axial position on the fan shaft 36 is generally at least approximately in line with, and often slightly forward of, the forward bearing, a, although the precise position may vary between different engine arrangements.

The change in angle, θ, is measured between the engine axis 9 and the tangent to the fan shaft 36 at the axial position of the CoG of the fan assembly (the point of application of the moment). The angular deflection is measured in response to a point radial moment applied to the fan shaft 36 in isolation (i.e. without the front engine structure 42 or other components) at the fan centre of gravity, with bearing centres pinned at "a" and "b".

The fan shaft tilt stiffness may be in the range from $5 \times 10^9$ to $12 \times 10^9$ N·mm/rad.

Figure 13:
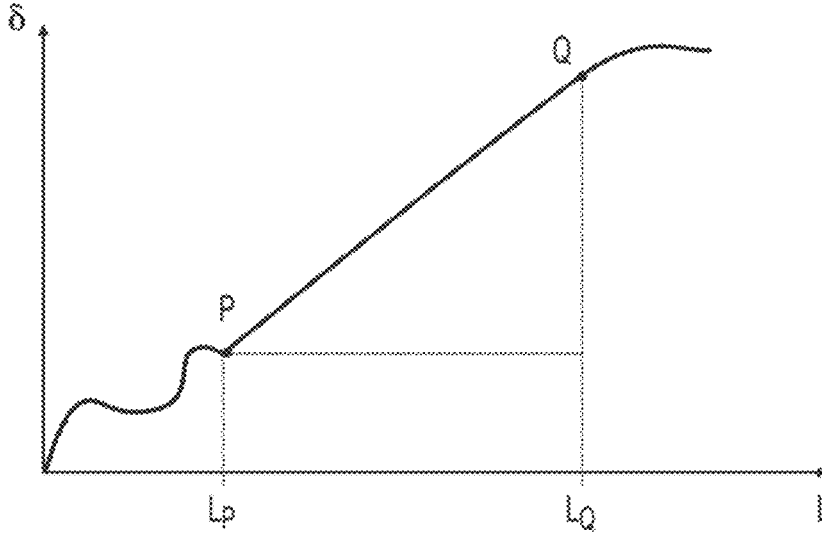
FIG. 13 is a graph of displacement against load, illustrating an elastic region within which stiffnesses of components may be determined.

FIG. 13 illustrates how the stiffnesses defined herein may be measured. FIG. 13 shows a plot of the displacement 8 resulting from the application of a load L (e.g. a force, moment or torque) applied to a component for which the stiffness is being measured. At levels of load from zero to $L_P$ there is a non-linear region in which displacement is caused by motion of the component (or relative motion of separate parts of the component) as it is loaded, rather than defor-mation of the component; for example moving within clear-ance between parts. At levels of load above $L_Q$ the elastic limit of the component has been exceeded and the applied load no longer causes elastic deformation—plastic deforma-tion or failure of the component may occur instead. Between points P and Q the applied load and resulting displacement have a linear relationship. The stiffnesses defined herein may be determined by measuring the gradient of the linear region between points P and Q (with the stiffness being the inverse of that gradient). The gradient may be found for as large a region of the linear region as possible to increase the accuracy of the measurement by providing a larger displace-ment to measure. For example, the gradient may be found by applying a load equal to or just greater than $L_P$ and equal to or just less than $L_Q$. Values for $L_P$ and $L_Q$ may be estimated prior to testing based on materials characteristics so as to apply suitable loads. Although the displacement is referred to as δ in this description, the skilled person would appre-ciate that equivalent principles may apply to a linear or angular displacement.

The stiffnesses defined herein, unless otherwise stated, are for the corresponding component(s) when the engine is under cruise conditions. The stiffnesses generally do not vary significantly over the operating range of the engine; the stiffness at cruise conditions of the aircraft to which the engine is used (those cruise conditions being as defined elsewhere herein), or at MTO conditions, may therefore be the same as for when the engine is not in use (i.e. off—at zero speed/on the bench). However, where the stiffness varies over the operating range of the engine, the stiffnesses defined herein are to be understood as being values for when the engine is operating at cruise conditions.

Figure 15:
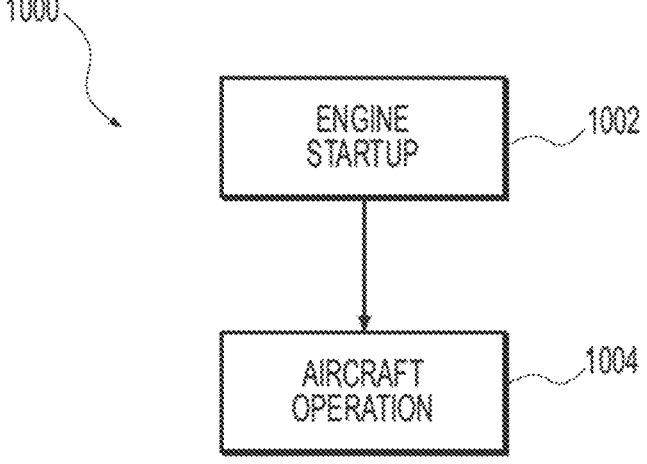
FIG. 15 illustrates various methods.

FIG. 15 illustrates a method 1000 which may be performed, optionally using an engine 10 as described above. The method 1000 comprises starting up 1002 an engine 10 of an aircraft and reaching operating conditions, and operating 1004 the aircraft. During operation 1004, the aircraft may operate at MTO speed for one or more time periods. One or more of the following may apply:

(i) a backward whirl frequency margin (A/B) of:

$$\frac{\text{the lowest frequency of either mode}}{\text{Fan } RTW \text{ or Rotor } RW \text{ at the } MTO \text{ speed}}{\text{the } MTO \text{ speed}}$$

may be in the range from 15 to 50%;

(ii) a forward whirl frequency margin (C/B) of:

$$\frac{\text{the frequency difference between sychronous}}{1FW \text{ and the first engine order line at } MTO \text{ speed}}{\text{the } MTO \text{ speed}}$$

may be in the range from 10 to 100%;

(iii) a mutual frequency margin (D/(A+B)) of:

$$\frac{\text{the frequency difference between mode}}{\text{Fan } RTW \text{ and mode Rotor } RW \text{ at the } MTO \text{ speed}}{\left(\begin{array}{c}\text{the lowest frequency of either mode Fan } RTW \\ \text{or Rotor } RW \text{ at the } MTO \text{ speed} + \text{the } MTO \text{ speed}\end{array}\right)}$$

may be in the range from 5 to 50%; and/or (iv) a front engine structure frequency margin (E/F) of:

$$\frac{\begin{array}{c}\text{the frequency difference between}\\ \text{mode } FSN \text{ and the highest frequency of either}\\ \text{synchronous Fan } RTW \text{ or synchronous Rotor } RW\end{array}}{\begin{array}{c}\text{the lowest natural frequency of}\\ \text{the front structure nodding pair of modes}\end{array}}$$

may be in the range from 5 to 50%.

The features as described above for the engine 10 may apply equivalently in the described methods 1000.

It will be understood that the invention is not limited to the embodiments above-described and that various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, the engine comprising:
   an engine core comprising a turbine, a compressor, and a core shaft connecting the turbine to the compressor;
   a fan system comprising:
       a fan located upstream of the engine core and comprising a plurality of fan blades rotating about a longitudinal engine axis and extending from a root at a hub to a tip, and a hub-to-tip ratio is less than 0.39, the fan having a moment of inertia about the longitudinal engine axis in a range from 100 kg·m² to 600 kg·m²; and
       a fan shaft supported by a forward bearing and a rearward bearing and having a tilt stiffness in a range from 5×10⁹ N·mm/rad to 12×10⁹ N·mm/rad; and
   a gearbox and a gearbox output shaft arranged to couple an output of the gearbox to the fan shaft, the gearbox receiving input from the core shaft and outputting drive to the fan via the gearbox output shaft so as to drive the fan at a lower rotational speed than the core shaft.

2. The gas turbine engine of claim 1, wherein the gearbox has a gear ratio of at least 3.1.

3. The gas turbine engine of claim 2, wherein a turbine entry temperature is at least 1700K at maximum take-off condition.

4. The gas turbine engine of claim 3, wherein the turbine entry temperature is in the range from 1700K to 2000 k at maximum take-off condition.

5. The gas turbine engine of claim 4, wherein the turbine entry temperature is in the range from 1700K to 1950 k at maximum take-off condition.

6. The gas turbine engine of claim 5, wherein a nacelle defines a bypass duct, and a bypass ratio at cruise conditions is greater than 11.5.

7. The gas turbine engine of claim 5, wherein the turbine is a first turbine, the compressor is a first compressor, and the core shaft is a first core shaft; the engine core comprises a second turbine, a second compressor, and a second core shaft connecting the second turbine to the second compressor; and the second turbine, the second compressor, and the second core shaft are arranged to rotate at a higher rotational speed than the first core shaft.

8. The gas turbine engine of claim 7, wherein an overall pressure ratio, which is defined as the ratio of the stagnation pressure upstream of the fan to the stagnation pressure at an exit of the second compressor, is greater than 40 at cruise conditions.

9. The gas turbine engine of claim 8, wherein the overall pressure ratio is greater than 45 at cruise conditions.

10. The gas turbine engine of claim 8, wherein the overall pressure ratio is in a range of from 45 to 60.

11. The gas turbine engine of claim 10, wherein a nacelle defines a bypass duct, and a bypass ratio at cruise conditions is greater than 12.5.

12. The gas turbine engine of claim 11, wherein the hub-to-tip ratio is in a range of from 0.31 to 0.39.

13. The gas turbine engine of claim 1, wherein the gearbox has a gear ratio of at least 3.2.

14. The gas turbine engine of claim 13, the hub-to-tip ratio is in a range of from 0.25 to 0.28.

15. The gas turbine engine of claim 1, wherein the fan comprises 20 fan blades, the hub-to-tip ratio is in a range of from 0.28 to 0.32, a fan tip loading is in the range of from 0.28 to 0.31, and a bypass ratio at cruise conditions is greater than 12.5.

16. The gas turbine engine of claim 1, wherein a turbine entry temperature is at least 1550K at cruise conditions.

17. The gas turbine engine of claim 16, wherein the turbine entry temperature is in a range of from 1550K to 1750K at cruise conditions, and a fan tip loading is greater than 0.31 at cruise conditions.

18. The gas turbine engine of claim 1, wherein a turbine entry temperature is at least 1600K at cruise conditions.

19. The gas turbine engine of claim 18, wherein the turbine entry temperature is in a range of from 1700K to 1750K at cruise conditions, and a fan tip loading is in a range of from 0.31 to 0.35.

20. The gas turbine engine of claim 19, wherein a nacelle defines a bypass duct, and a bypass ratio at cruise conditions is greater than 12.

\* \* \* \* \*